US012424766B2

(12) United States Patent
Mohamed Abdelgaied Abdellatif

(10) Patent No.: US 12,424,766 B2
(45) Date of Patent: Sep. 23, 2025

(54) WIDE BAND DUAL-POLARIZED PLANAR ANTENNA ARRAY

(71) Applicant: SAAB LTD-ABU DHABI, Abu Dhabi (AE)

(72) Inventor: Ibrahim Mohamed Abdelgaied Abdellatif, Abu Dhabi (AE)

(73) Assignee: SAAB LTD-ABU DHABI, Abu Dhabi (AE)

( * ) Notice: Subject to any disclaimer, the term of this patent is extended or adjusted under 35 U.S.C. 154(b) by 140 days.

(21) Appl. No.: 18/290,212

(22) PCT Filed: Aug. 31, 2021

(86) PCT No.: PCT/IB2021/057932
§ 371 (c)(1),
(2) Date: Nov. 10, 2023

(87) PCT Pub. No.: WO2022/238744
PCT Pub. Date: Nov. 17, 2022

(65) Prior Publication Data

US 2024/0266753 A1 Aug. 8, 2024

Related U.S. Application Data

(60) Provisional application No. 63/186,264, filed on May 10, 2021.

(51) Int. Cl.
*H01Q 21/06* (2006.01)
*H01Q 1/42* (2006.01)
(Continued)

(52) U.S. Cl.
CPC ........... *H01Q 21/064* (2013.01); *H01Q 1/422* (2013.01); *H01Q 5/378* (2015.01); *H01Q 21/08* (2013.01)

(58) Field of Classification Search
None
See application file for complete search history.

(56) References Cited

U.S. PATENT DOCUMENTS 7,202,818 B2 * 4/2007 Anguera Pros .......... H01Q 1/36 343/846
7,388,556 B2 * 6/2008 Zimmerman ............ H01Q 9/26 343/834

(Continued)

FOREIGN PATENT DOCUMENTS

JP 2000-223926 A 8/2000
JP 2001-007628 A 1/2001

OTHER PUBLICATIONS

International Search Report for PCT/IB2021/057932, dated Feb. 7, 2022.

(Continued)

*Primary Examiner* — Crystal L Hammond
(74) *Attorney, Agent, or Firm* — Sage Patent Group

(57) ABSTRACT

An antenna element includes a multi-layer printed circuit board (PCB). The PCB includes a top metal layer, a second metal layer, a third metal layer, and a bottom metal layer. Dielectric layers are positioned between each of the metal layers. A thickness of the PCB is defined by a total thickness of the layers. The top metal layer, the second metal layer, and the third metal layer are all of different lengths. The second metal layer and the third metal layer include a plurality of slots formed therein. Each of the plurality of slots having a size and a position tuned to a central frequency. The antenna array of the plurality of antenna elements are arranged oriented in two orthogonal polarizations.

9 Claims, 7 Drawing Sheets

(51) Int. Cl.

| | |
|---|---|
| ***H01Q 5/378*** | (2015.01) |
| ***H01Q 21/08*** | (2006.01) |

(56) References Cited

U.S. PATENT DOCUMENTS

| | | | |
|---|---|---|---|
| 2002/0113737 | A1 | 8/2002 | Brachat et al. |
| 2005/0190106 | A1 | 9/2005 | Anguera Pros et al. |
| 2018/0219272 | A1 | 8/2018 | Baheti et al. |
| 2019/0267697 | A1 | 8/2019 | Quinlan et al. |

OTHER PUBLICATIONS

Written Opinion for PCT/IB2021/057932, dated Feb. 7, 2022.

Extended European Search Report mailed Mar. 3, 2025 for European Patent Application 21939997.9, 8 pages.

Falade, Oluyemi et al.; "Single Feed Stacked Patch Circular Polarized Antenna for Triple Band GPS Receivers"; IEEE Transactions On Antennas and Propagation, vol. 60, No. 10; Oct. 2012; XP011469758; pp. 4479-4484 (6 pages).

* cited by examiner

WIDE BAND DUAL-POLARIZED PLANAR ANTENNA ARRAY

This application is a National Stage of International Application No. PCT/IB2021/057932 filed Aug. 31, 2021, claiming priority based on U.S. Provisional Patent Application No. 63/186,264 filed May 10, 2021.

FIELD OF THE INVENTION

The present invention pertains to the field of antenna arrays and digital radar, and in particular to a planar antenna array implementing 3D beam steering and full dimensional MIMO.

BACKGROUND

Different designs and types of the phased array antennas are used for the electronic beam steering in the different applications such as fully digital radars, AESA radars, rotating radars, and 5G mobile communications.

Slotted waveguide arrays are one type of phased array antenna that is widely used in radar applications. Slotted waveguide arrays suffer from several drawbacks including that they are of heavy weight, the frequency bandwidth of slotted waveguide antennas is very narrow, the cross-polarization level is high, and that the radiation efficiency is low. Moreover, it requires high manufacturing accuracy with low tolerances which leads to higher manufacturing cost.

Another type of the conventional antenna technology that is widely used in dual-polarized electronically steerable array technology that is based on the end-fire antenna element design. End-fire antenna arrays also suffer from several drawbacks. End-fire antenna elements use balanced antenna elements to implement phased arrays and require balanced to unbalanced converters which adds additional complexity and losses to the system. Moreover, when impedance matching is done through a transition from strip-line to micro-strip-line the cross-polar radiation increases. Additionally, in a two-dimensional end-fire antenna array design, the antenna elements are mounted separately and perpendicular on the ground plane which adds more complexity to the mechanical design and increases the manufacturing cost.

Steerable phased array antennas may also be implemented on a multi-layer printed circuit board (PCB) using a conventional stacked patch array or unbalanced multi-layer antenna array. These antenna designs suffer from several drawbacks including that they have a narrow frequency bandwidth. Furthermore, these designs have impedance mismatch problem at some of the steering angles especially when the beam is needed to be electronically steered to cover a sector of 120°.

Dual-polarized radars are another type of antenna that is usually implemented in the alternate mode where both polarizations are switched alternately, or hybrid mode where both polarizations are transmitted and received simultaneously. Modern dual-polarized radars usually transmit in both polarization directions simultaneously. So, in addition to the previous challenges, the dual-polarized radar antenna must also work with both dual-polarized radar operating modes.

Therefore, there is a need for a wide band dual-polarized planar antenna array that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a wide band dual-polarized planar antenna array for digital radar and beam steering applications.

In accordance with embodiments of the present invention, there is provided an antenna element including a multi-layer printed circuit board (PCB). The PCB includes a top metal layer, a second metal layer, a third metal layer, and a bottom metal layer, with dielectric layers positioned between each of the metal layers. A thickness of the PCB is defined by a total thickness of the layers. The top metal layer, the second metal layer, and the third metal layer all have different lengths. The second metal layer and the third metal layer including a plurality of slots formed therein, where each of the plurality of slots having a size and a position tuned to a central frequency and frequency bandwidth.

In further embodiments, there is a first distance between a bottom surface of the top metal layer and an upper surface of the second metal layer, a second distance between a bottom surface the second metal layer and a top surface of the third metal layer, and a third distance between a bottom surface of the third metal layer and a top surface of the bottom metal layer, and all three distances are equal.

In further embodiments, the dielectric layers include a top dielectric layer between the top metal layer and the second metal layer where the top dielectric layer includes a top dielectric core layer and a top dielectric prepeg layer. The dielectric layers also include a central dielectric layer between the second metal layer and the third metal layer, where the central dielectric layer includes a central dielectric core layer. The dielectric layers also include a bottom dielectric layer between the third metal layer and the bottom metal layer, where the bottom dielectric layer includes a bottom dielectric core layer and a bottom dielectric prepeg layer.

In further embodiments, the dielectric layers are comprised of a same dielectric material.

Further embodiments include a direct probe formed by a metal via within the top metal layer, the second metal layer, the third metal layer, bottom metal layer, and the dielectric layers.

In further embodiments, the direct probe has a direct feed to two of the top metal layer, the second metal layer, and the third metal layer, the direct probe having a parasitic coupling feed to one of the top metal layer, the second metal layer, and the third metal layer not having the direct feed.

In further embodiments, each of the top metal layer, the second metal layer, the third metal layer, and the bottom metal layer have a shape of rectangular arms. A length of the top metal layer is shorter than a length of the second metal layer. The length of the second metal layer is shorter than a length of the third metal layer. The length of the third metal layer is shorter than a length of the bottom metal layer.

In further embodiments, the plurality of slots are of a plurality of shapes and sizes.

In accordance with embodiments of the present invention, there is provided an antenna array including a plurality of antenna elements as defined herein where the plurality of antenna elements are arranged in a planar, two dimensional array.

In further embodiments, the plurality of antenna elements are arranged oriented in two orthogonal polarizations.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention provide a wide band dual-polarized planar antenna array for digital radar and beam steering application.

Embodiments have the ability to steer the beam in the azimuth, in the elevation, or in both the azimuth and elevation and have the ability to perform two-dimensional (2D), three-dimensional (3D), or both 2D and 3D beam steering. (two-dimensional and/or three-dimensional beam steering). Embodiments may be used in wireless applications that require beam steering and beam forming in two or three dimensions. The proposed antenna array can generate a narrow beam that can be steered electronically in azimuth, in elevation, or in both azimuth and elevation to cover up to 120° azimuth or elevation sectors.

Embodiments may operate on a single frequency band or dual frequency bands.

Embodiments include an antenna array including small size unbalanced antenna elements that do not need impedance matching networks. The use of impedance matched networks adds losses to a system and reduce an antenna's efficiency. Impedance matching networks have frequency dependent components and therefore reduce the operating frequency bandwidth of antennas that utilize them.

Figure 1:
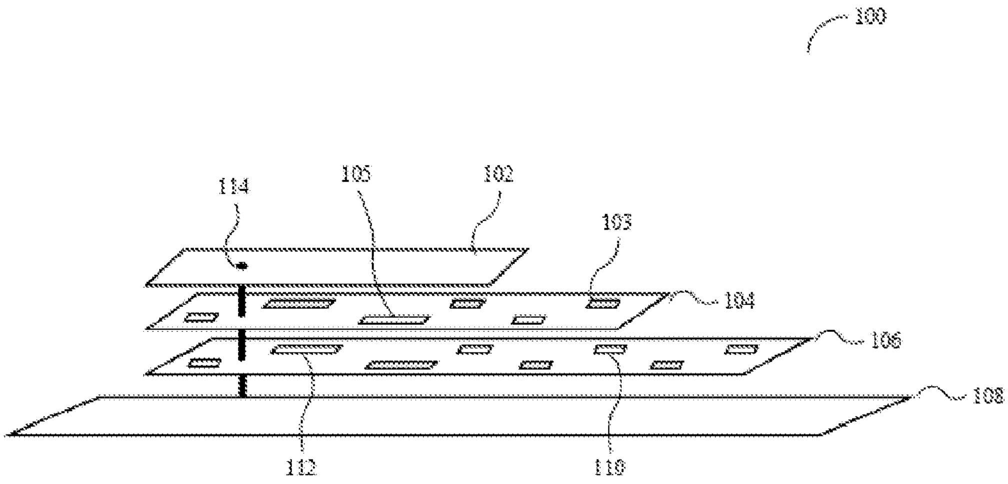
FIG. 1 provides a perspective view of an antenna element illustrating the metal layers, according to an embodiment.

With reference to FIG. 1, embodiments include an antenna element 100 design printed on a multilayer circuit board. The printed circuit board (PCB) stack includes a planar top metal layer 102, bottom metal layer 108, a second top central metal layer 104, and a third bottom central metal layer 106. The bottom metal layer 108 also acts as a common ground layer for the antenna array 100.

Figure 2:
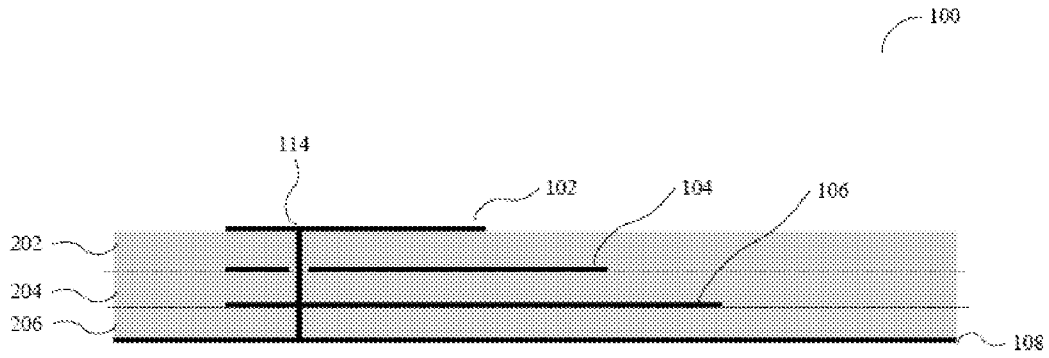
FIG. 2 illustrates a side view of the PCB layers of an antenna element, according to an embodiment.

FIG. 2 illustrates three layers of dielectric materials between the different metal layers for antenna element 100. These include a first top dielectric layer 202 between the top metal layer 102 and the second metal layer 104, a second central dielectric layer 204 between the second metal layer 104 and the third bottom metal layer 106, and a third dielectric layer 206 between the third metal layer 106 and the bottom metal layer 108. In embodiments, the top metal layer 102 is smaller than the second metal layer 104. The second metal layer 104 is smaller than the third bottom central metal layer 106. The third bottom central metal layer 106 is smaller than the bottom metal layer 108.

Figure 3:
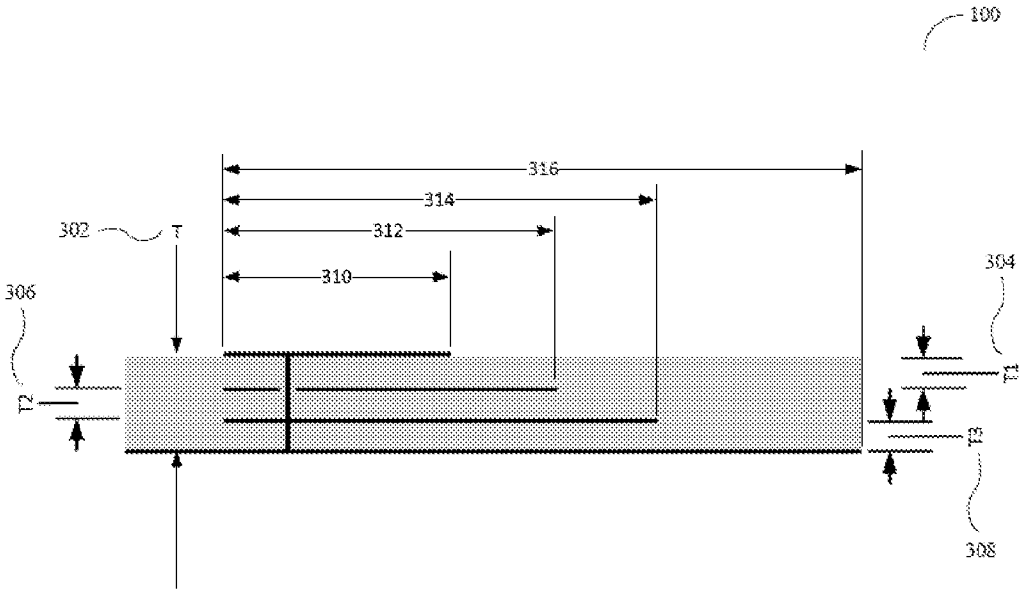
FIG. 3 illustrates a side view of the PCB layers of an antenna element with cross section dimensions indicated, according to an embodiment

With reference to FIG. 3, the thickness, T 302, of the dielectric portions and metal portions of the layers that comprise the PCB define distances between the surfaces of the metal layers of antenna element 100. The distance between the top surface of the top metal layer 102 and the bottom surface of the bottom metal layer 108 defines the thickness, T 302, of the antenna array board 100. The distance between the bottom surface of the top metal layer 102 and the top surface of the top central metal layer 104 defines the top thickness, $T_1$ 304, of the antenna board 100, while the distance between the top surface of the bottom metal layer 108 and the bottom surface of the bottom central metal layer 106 defines the bottom thickness, $T_3$ 308, of the antenna board 100. The central thickness, $T_2$ 306, of the antenna board 100 is defined by the distance between the top surface of the bottom central metal layer 106 and the bottom surface of the top central metal layer 104.

In embodiments, the antenna board 100 may be implemented in different ways. The top thickness, $T_1$ 304, the central thickness, $T_2$ 306, and the bottom thickness, $T_3$ 308 may be equal: $T_1=T_2=T_3$. In embodiments, the top thickness, $T_1$ 304, and the central thickness, $T_2$ 306, may be equal to each other but different from the bottom thickness, $T_3$ 308: $T_1=T_2\neq T_3$.

In embodiments, the top dielectric 202 includes a top core layer and a top prepreg layer disposed between the top central metal layer 104 and the top core layer, while the central dielectric 204 is the core layer between the top central metal layer 104 and the bottom central metal layer 106. The bottom dielectric 206 includes the bottom core layer and the bottom prepreg disposed between the bottom core layer and the bottom central metal layer 106.

In some implementations, the top dielectric, the central dielectric, and the bottom dielectric may use the same dielectric materials. In some other examples, the top, central and bottom dielectrics can use different materials.

In embodiments, the antenna element design may be a planar two-dimensional array of small size perpendicular antenna elements. Two small sized antenna elements with two orthogonal polarizations may be used in the array to generate two perpendicular linear polarization or to generate a circular polarization. The perpendicular antenna elements can both cover the full operating frequency bandwidth simultaneously.

With reference to FIG. 1, in embodiments the antenna element 100 consists of 4 layers, as shown in FIG. 1, where the top 3 layers 102, 104, and 106 are narrow rectangular metal arms with different lengths, while the bottom layer 108 is a common metal ground plane with dielectric materials between the different metal layers as shown in FIG. 2.

In embodiments, top metal layer 102 includes a solid metal plane of a length 310. Central second metal layer 104 includes a metal plane of length 312 with slots, such as slot 103 and slot 105, of different sizes formed within, where the area of slots 103 and 105 have no metal therein. Central third metal layer 106 includes a metal plane of length 314 with slots, such as slot 110 and slot 112, of different sizes formed within, where the area of slots 110 and 112 have no metal therein. Bottom metal ground layer 108 includes a solid metal plane of length 316. In embodiments, $L_{310} \leq L_{312} \leq L_{314} \leq L_{316}$.

The design of the slots in the different metal layers may be square, rectangular, or both square and rectangular. The slots in the different layers may all have the same shape or different shapes. The slots in the different layers may all have the same dimensions or different dimensions. In embodiments, one or two of the antenna element metal layers may not have any slots.

The antenna array elements are fed by direct probe feed 114 which is implemented by a metal via drilled through the different printed circuit board layers. Direct feed 114 is used to connect to externa electronic circuitry to transmit and receive electronics signals to implement various communications protocols as is known in the art. Top metal layer 102 and the third metal layer 106 have a direct feed while the second metal layer 104 has a parasitic coupling feed. Second metal layer 104 and third metal layer 106 have several slots with different sizes and shapes. Radiation patterns can be optimized by calculating and changing the different antenna parameters. The antenna can be designed and optimized to operate in a single band (for example, X-band) or dual-band (for example, X-band and Ku-band).

The used of small size antenna elements 100 in designs allows for the implementation of orthogonally polarized antenna arrays with a minimum spacing of half wavelength between the elements and high isolation between antenna elements which reduces the side grating lobe level.

The small size and the narrow width of the antenna element 100 design allows for the optimization of the relative positions and distances between multiple antenna elements to improve the isolation and the mutual coupling between the adjacent antenna elements as well as improving the cross-polar coupling between the perpendicular polarization elements and the cross-polarization ratio. The cross-polar coupling may lead to retrieval errors when radar measurements are used to estimate the co-polar parameters. The value of the cross-polar coupling may be improved to reduce the error rate.

In embodiments, the antenna array can be printed in on a single planar circuit board. The dielectric material type may be selected based on the required antenna performance and frequency bandwidth. In some examples the used dielectric material may be Rogers RO3003™. In other examples the used dielectric material may be Rogers RT/Duroid® 5880. Both materials are widely used and available in the market. Additionally, other dielectric materials may be used. The use of PCB technology and the simple mechanical design allows for the use of simple mechanical supports and mounting parts which helps to control the cost of antenna element 100.

Figure 4:
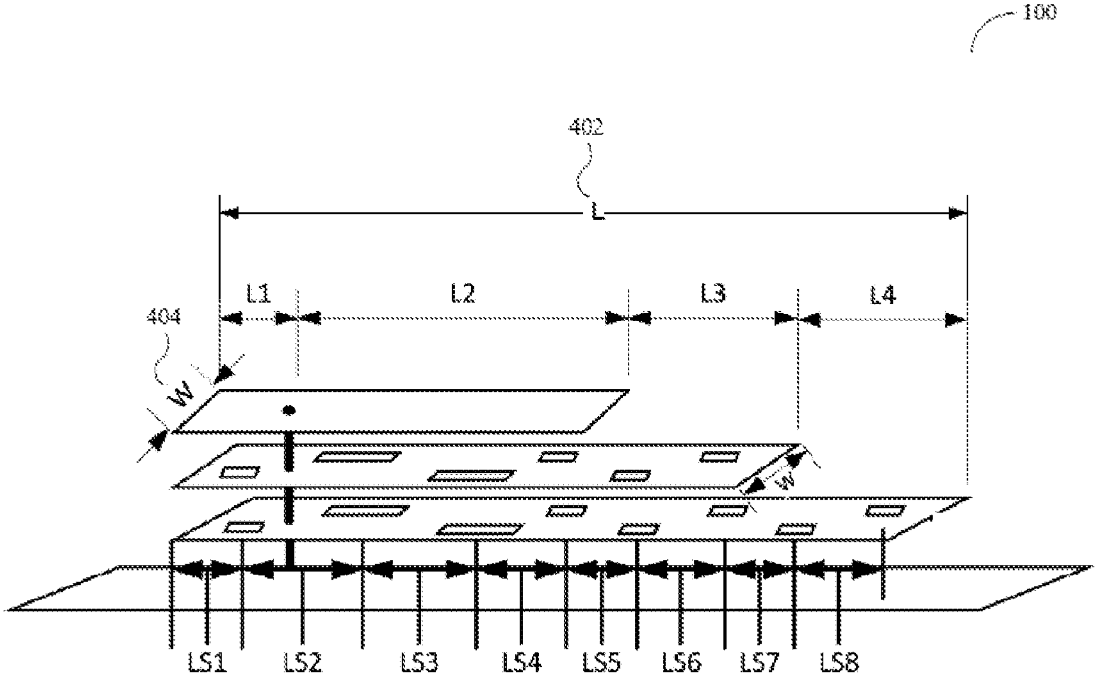
FIG. 4 illustrates a perspective view of an antenna element illustrating the metal layers with dimensions indicated, according to an embodiment.

FIG. 4 illustrates an embodiment where the dimensions of the array element 100 were designed and optimized for X-band fully digital radar applications. The general shape of antenna element 100 and each of its layers is that of a rectangular arm. The total length of the antenna element 100, L 402, is 13 mm, while the total width, W 404, is 3 mm and the total thickness, T 302, is 4.56 mm. The used dielectric material between all the layers is Rogers RO3003™ which has a dielectric constant of 3 and the loss tangent is 0.0013.

Figure 5:
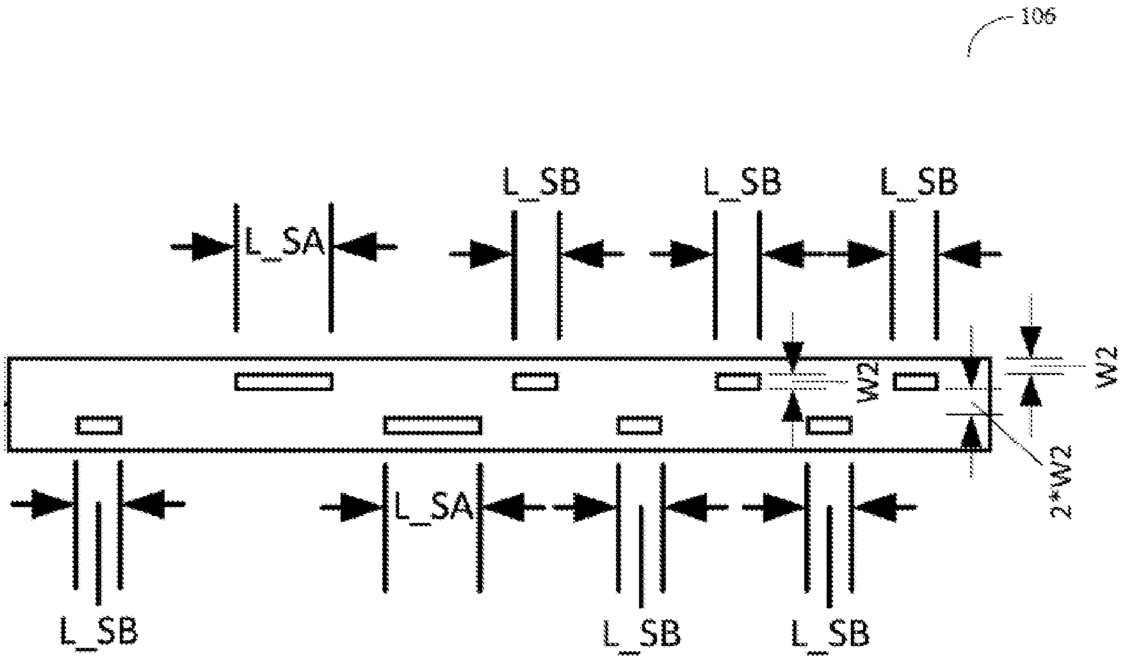
FIG. 5 illustrates a planar view of a metal layer of an antenna with dimensions indicated, according to an embodiment.

With reference to FIG. 3, FIG. 4, and FIG. 5, the embodiment illustrated in FIG. 4, the following table lists dimensions of an antenna element 100 with a central frequency in the X-band.

| Dimension | mm | Dimension | mm |
|---|---|---|---|
| L1 | 1.2 | LS1 | 0.98 |
| L2 | 4.8 | LS2 | 2.31 |
| L3 | 2.3 | LS3 | 1.98 |
| L4 | 4.7 | LS4 | 1.63 |
| T1 | 1.52 | LS5 | 1.28 |
| T2 | 1.52 | LS6 | 1.28 |
| T3 | 1.52 | LS7 | 1.28 |
| L_SA | 1.3 | LS8 | 1.28 |
| L_SB | 0.6 | W | 0.3 |
| | | W2 | 0.05 |

In embodiments, the dimensions of antenna element 100 listed above with reference to FIG. 3, FIG. 4, and FIG. 5 may be scaled using a scaling factor to operate at other frequencies. For example, if the central frequency of the embodiment of FIG. 3, FIG. 4, and FIG. 5 is $F_{old}$ and a new antenna is to be constructed with a central frequency of $F_{new}$, then a scaling factor, SF, of $SF=F_{old}/F_{new}$ may be used.

Figure 6:
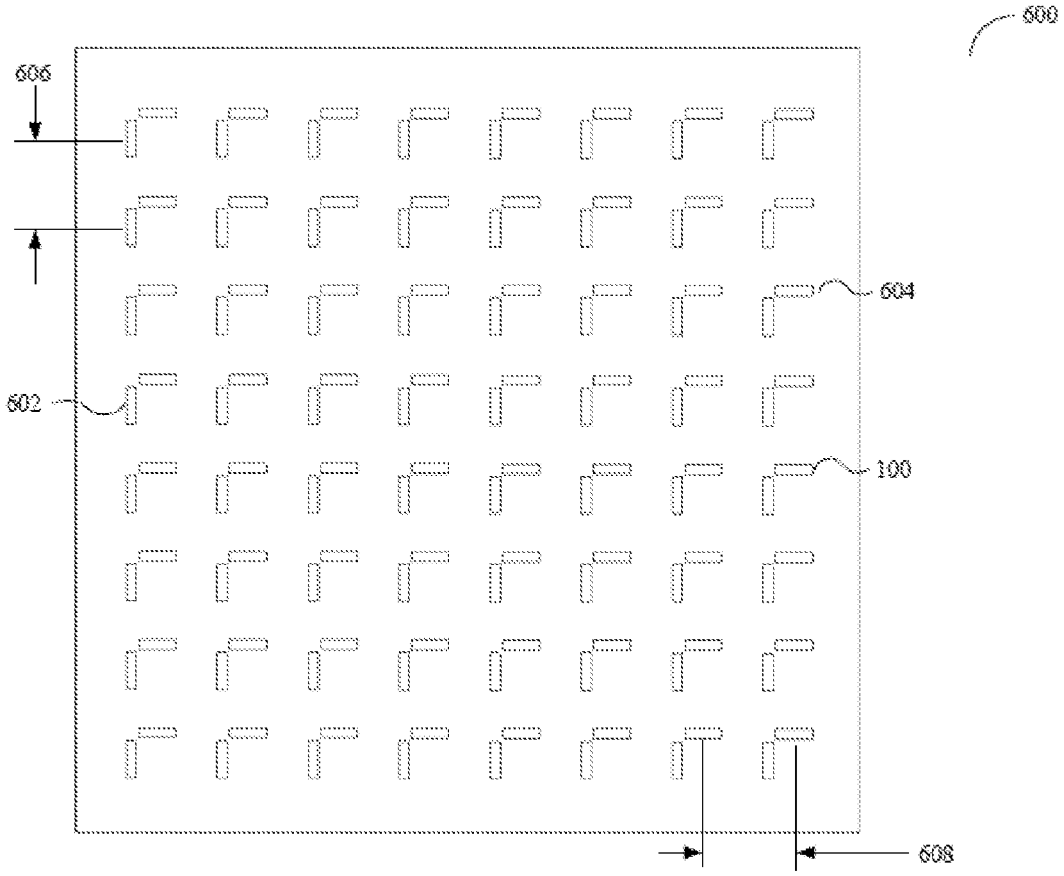
FIG. 6 illustrates a planar view of a layout of a dual-polarized antenna array, according to an embodiment.

FIG. 6 illustrates an embodiment of a dual-polarized antenna array 600 optimized for operation in the X-band and utilizing antenna elements 100 of similar dimensions to FIG. 3, FIG. 4, and FIG. 5. The antenna array 600 may consist of multiple antenna elements 100 as described above. Antenna elements are spaced at regular intervals in the vertical direction 606 and in the horizontal direction 608. Antenna elements are also oriented in a vertical direction, such as antenna element 602, and in a horizontal direction, such as antenna element 604.

Figure 7:
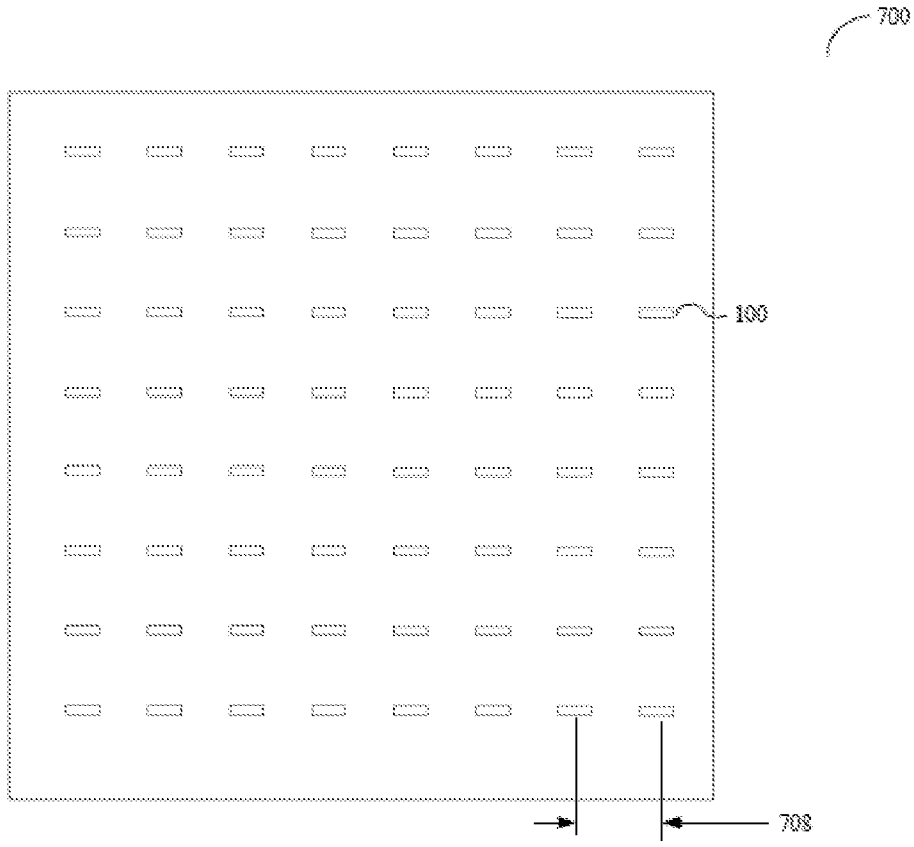
FIG. 7 illustrates a planar view of a metal layout of a single-polarized antenna array, according to an embodiment.

FIG. 7 illustrates an embodiment of a single-polarized antenna array 700 optimized for operation in the X-band and utilizing similar dimensions to FIG. 3, FIG. 4, and FIG. 5. The antenna array 700 may consist of multiple antenna elements 100 as described above. Antenna elements are spaced by a fixed distance 708.

In embodiments, antenna element 100 may operate in a single polarized mode, linear horizontal or linear vertical, or dual-polarized mode. The antenna 100 may be used in the different modes of the dual-polarized radar, the alternate mode where both polarizations are switched alternately, or the hybrid mode where both polarizations are transmitted and received simultaneously.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention

The invention claimed is:

1. An antenna element comprising:

a multi-layer printed circuit board (PCB), the PCB including a top metal layer, a second metal layer, a third metal layer, and a bottom metal layer, the PCB including dielectric layers positioned between each of the metal layers, a thickness of the PCB being defined by a total thickness of the layers, the top metal layer, the second metal layer, and the third metal layer all of different lengths, the second metal layer and the third metal layer including a plurality of slots formed therein, each of the plurality of slots having a size and a position tuned to a central frequency and frequency bandwidth;

wherein each of the top metal layer, the second metal layer, the third metal layer, and the bottom metal layer have a shape of rectangular arms, a length of the top metal layer being shorter than a length of the second metal layer, the length of the second metal layer being shorter than a length of the third metal layer, and the length of the third metal layer being shorter than a length of the bottom metal layer.

2. The antenna element of claim 1 wherein a first distance between a bottom surface of the top metal layer and an upper surface of the second metal layer, a second distance between a bottom surface the second metal layer and a top surface of the third metal layer, and a third distance between a bottom surface of the third metal layer and a top surface of the bottom metal layer are equal.

3. The antenna element of claim 1 wherein the dielectric layers comprising:

a top dielectric layer between the top metal layer and the second metal layer, the top dielectric layer including a top core layer and a top prepeg layer;

a central dielectric layer between the second metal layer and the third metal layer, the central dielectric layer including a central core layer; and a bottom dielectric layer between the third metal layer and the bottom metal layer, the bottom dielectric layer including a bottom core layer and a bottom prepeg layer.

4. The antenna element of claim 1 wherein the dielectric layers are comprised of a same dielectric material.

5. The antenna element of claim 1 further comprising a direct probe formed by a metal via within the top metal layer, the second metal layer, the third metal layer, the bottom metal layer, and the dielectric layers.

6. The antenna element of claim 5 wherein the direct probe has a direct feed to two of the top metal layer, the second metal layer, and the third metal layer, the direct probe having a parasitic coupling feed to one of the top metal layer, the second metal layer, and the third metal layer not having the direct feed.

7. The antenna element of claim 1 wherein the plurality of slots are of a plurality of shapes and sizes.

8. An antenna array comprising:

a plurality of antenna elements as defined in claim 1, the plurality of antenna elements arranged in a planar, two dimensional array.

9. The antenna array of claim 8 wherein the plurality of antenna elements are arranged oriented in a first orthogonal polarization and in a second orthogonal polarization, the top metal layer, the second metal layer, the third metal layer, and the bottom metal layer of antenna elements arranged oriented in the first orthogonal polarization being the same as the corresponding top metal layer, the second metal layer, the third metal layer, and the bottom metal layer of antenna elements arranged oriented in the second orthogonal polarization, each of the plurality of antenna elements not intersecting each other in the top metal layer, the second metal layer and the third metal layer, while each of the plurality of antenna elements share the bottom metal layer.

* * * * *